United States Patent
Konishi

(10) Patent No.: US 11,061,634 B2
(45) Date of Patent: Jul. 13, 2021

(54) ELECTRONIC DEVICE AND IMAGE FORMING APPARATUS THAT DISPLAY PREREGISTERED INFORMATION ON DISPLAY DEVICE, DEPENDING ON OPEN OR CLOSED STATE THEREOF

(71) Applicant: KYOCERA Document Solutions Inc., Osaka (JP)

(72) Inventor: Kohei Konishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/905,875

(22) Filed: Jun. 18, 2020

(65) Prior Publication Data

US 2020/0409638 A1    Dec. 31, 2020

(30) Foreign Application Priority Data

Jun. 28, 2019    (JP) .............................. JP2019-121757

(51) Int. Cl.
| | | |
|---|---|---|
| *G06F 12/00* | (2006.01) | |
| *G06F 3/12* | (2006.01) | |
| *G06F 3/0487* | (2013.01) | |
| *G06F 1/18* | (2006.01) | |
| *H04N 1/00* | (2006.01) | |

(Continued)

(52) U.S. Cl.
CPC ............ *G06F 3/1256* (2013.01); *G06F 1/182* (2013.01); *G06F 3/0487* (2013.01); *G06F 3/1238* (2013.01); *G09F 9/301* (2013.01); *H04N 1/00411* (2013.01); *H04N 1/00496* (2013.01); *B41J 3/4075* (2013.01); *G03G 15/502* (2013.01); *G06F 3/1255* (2013.01); *G06F 2200/1637* (2013.01); *H04N 1/00129* (2013.01)

(58) Field of Classification Search
None
See application file for complete search history.

(56) References Cited

U.S. PATENT DOCUMENTS

2001/0015827 A1* 8/2001 Ishiyama ........... H04N 1/00496
                                                          358/468
2006/0171734 A1* 8/2006 Maeda ............... G03G 15/5016
                                                          399/81

(Continued)

FOREIGN PATENT DOCUMENTS

JP    2014-511524 A    5/2014
JP    2018-031884 A    3/2018

*Primary Examiner* — Haris Sabah
(74) *Attorney, Agent, or Firm* — IP Business Solutions, LLC

(57) ABSTRACT

An electronic device includes a display device, a state detector, a storage device, an input device, and a control device. The control device causes the display device to display, when the open state is detected by the state detector, and the user information stored in the storage device and information received through the input device agree with each other, first information stored in the storage device in association with user information on a first display panel exposed in an open state of the display device, and restricts the display device from displaying the first information, when the open state of the display device is detected by the state detector, but the user information and the information received through the input device disagree, or when a folded state is detected by the state detector.

8 Claims, 14 Drawing Sheets

(51) Int. Cl.
*G09F 9/30* (2006.01)
*B41J 3/407* (2006.01)
*G03G 15/00* (2006.01)

(56) References Cited

U.S. PATENT DOCUMENTS

| | | | |
|---|---|---|---|
| 2011/0231011 A1* | 9/2011 | Powers | G16H 20/13 |
| | | | 700/236 |
| 2012/0162690 A1* | 6/2012 | Ishiguro | H04N 1/00928 |
| | | | 358/1.14 |
| 2013/0194631 A1* | 8/2013 | Anezaki | H04N 1/00384 |
| | | | 358/1.15 |
| 2013/0321340 A1 | 12/2013 | Seo et al. | |
| 2015/0138581 A1* | 5/2015 | Aso | G06F 3/1239 |
| | | | 358/1.13 |
| 2015/0309691 A1 | 10/2015 | Seo et al. | |
| 2015/0324675 A1* | 11/2015 | Morii | G06K 15/4095 |
| | | | 358/1.14 |
| 2015/0378503 A1 | 12/2015 | Seo et al. | |
| 2017/0052698 A1 | 2/2017 | Seo et al. | |
| 2019/0272091 A1 | 9/2019 | Seo et al. | |

* cited by examiner

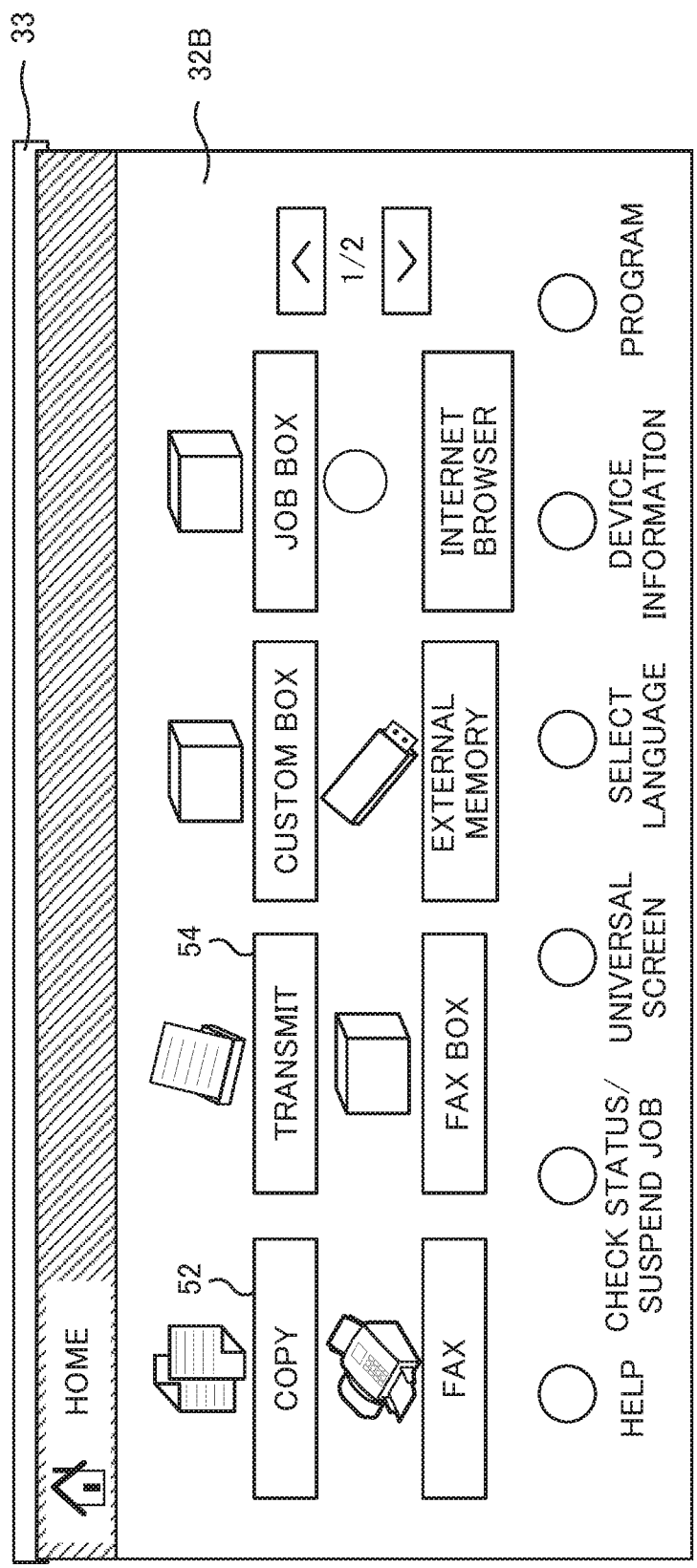

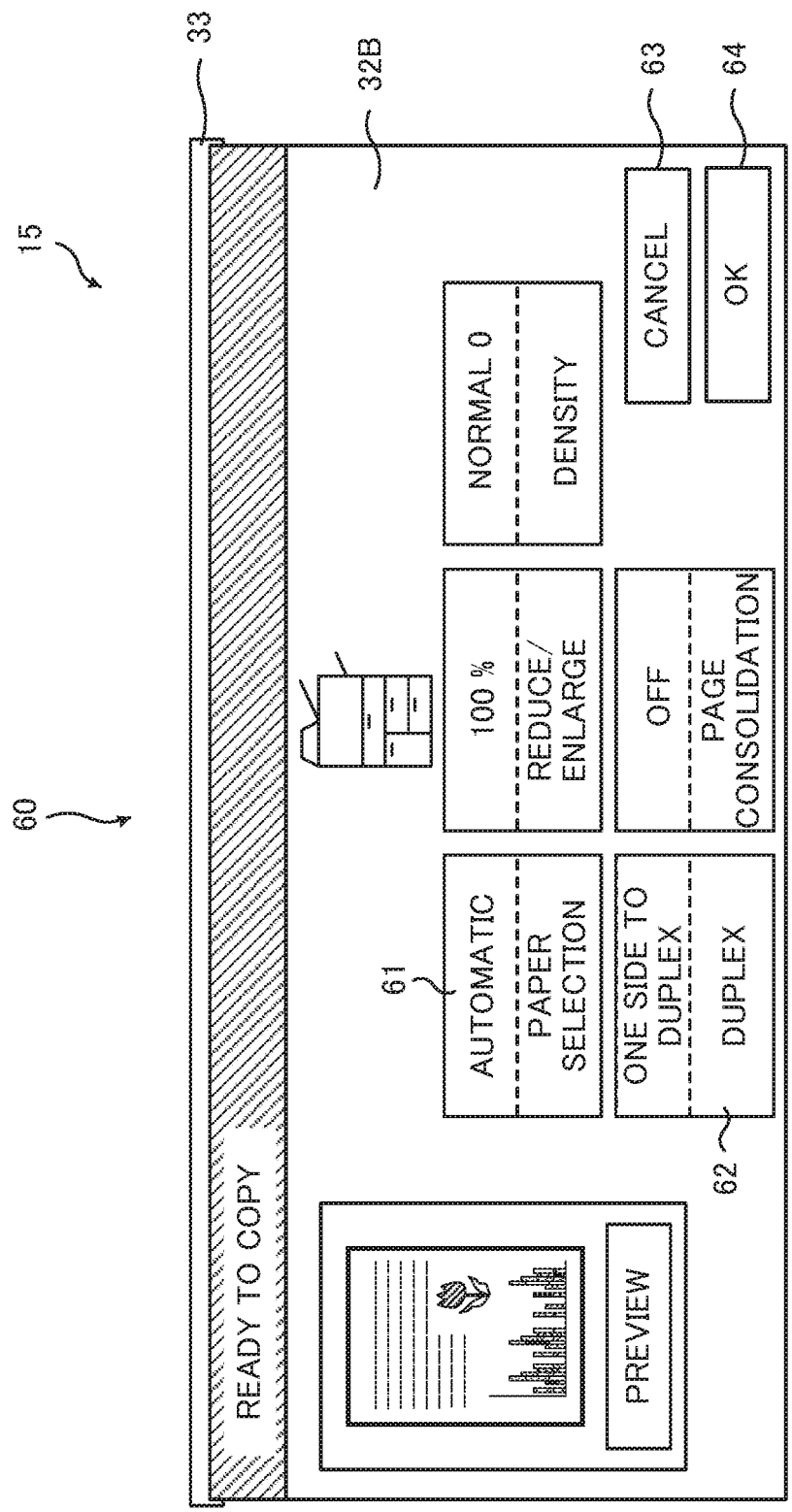

ELECTRONIC DEVICE AND IMAGE FORMING APPARATUS THAT DISPLAY PREREGISTERED INFORMATION ON DISPLAY DEVICE, DEPENDING ON OPEN OR CLOSED STATE THEREOF

INCORPORATION BY REFERENCE

This application claims priority to Japanese Patent Application No. 2019-121757 filed on Jun. 28, 2019, the entire contents of which are incorporated by reference herein.

BACKGROUND

The present disclosure relates to an electronic device and an image forming apparatus, and in particular to a technique to display preregistered information on a display device.

Techniques to utilize a folding-type display are currently known. For example, it is possible to switch a call mode, depending on whether the display is folded or opened. It is also possible to select a display region depending on the folding posture, and control the display with respect to the selected display region.

SUMMARY

The disclosure proposes further improvement of the foregoing technique.

In an aspect, the disclosure provides an electronic device including a display device, a state detector, a storage device, an input device, and a control device. The display device is configured to be folded. The state detector detects whether the display device is in a folded state or an open state. The storage device contains, in advance, user information for identifying a user, and first information associated with the user information. The input device is used by the user to input information. The control device includes a processor, and acts, when the processor executes a control program, as a controller that causes the display device to display, when the open state is detected by the state detector and when the user information stored in the storage device and the information received through the input device agree with each other, the first information stored in the storage device in association with the user information on a first display panel exposed in the open state, and restricts the display device from displaying the first information, when the open state is detected by the state detector, but the user information and the information received through the input device disagree, or when the folded state is detected by the state detector.

In another aspect, the disclosure provides an image forming apparatus including the foregoing electronic device and an image forming device. The image forming device forms an image on a recording medium.

BRIEF DESCRIPTION OF THE DRAWINGS

FIG. 5 is a schematic drawing showing an example of a home screen.

FIG. 6 is a schematic drawing showing an example of a setup screen.

DETAILED DESCRIPTION

Figure 1:
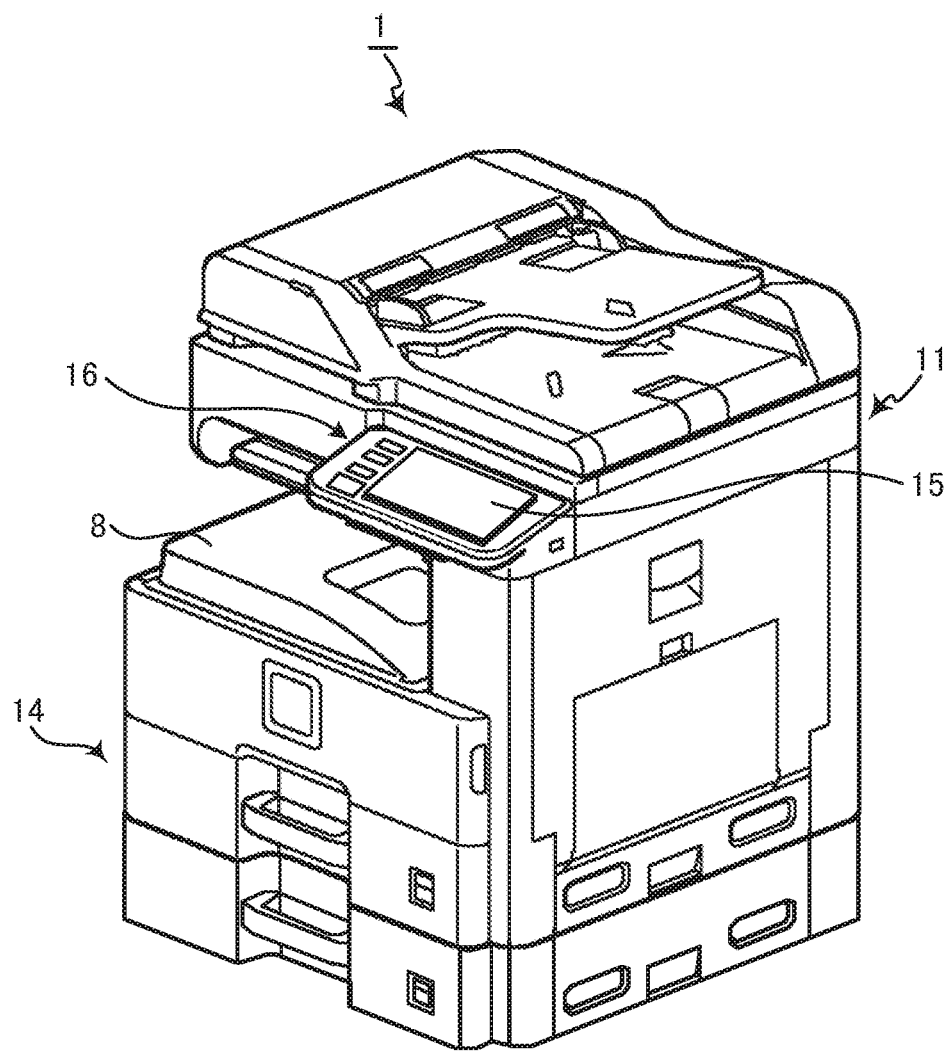
FIG. 1 is a perspective view showing an appearance of an image forming apparatus.
Figure 2:
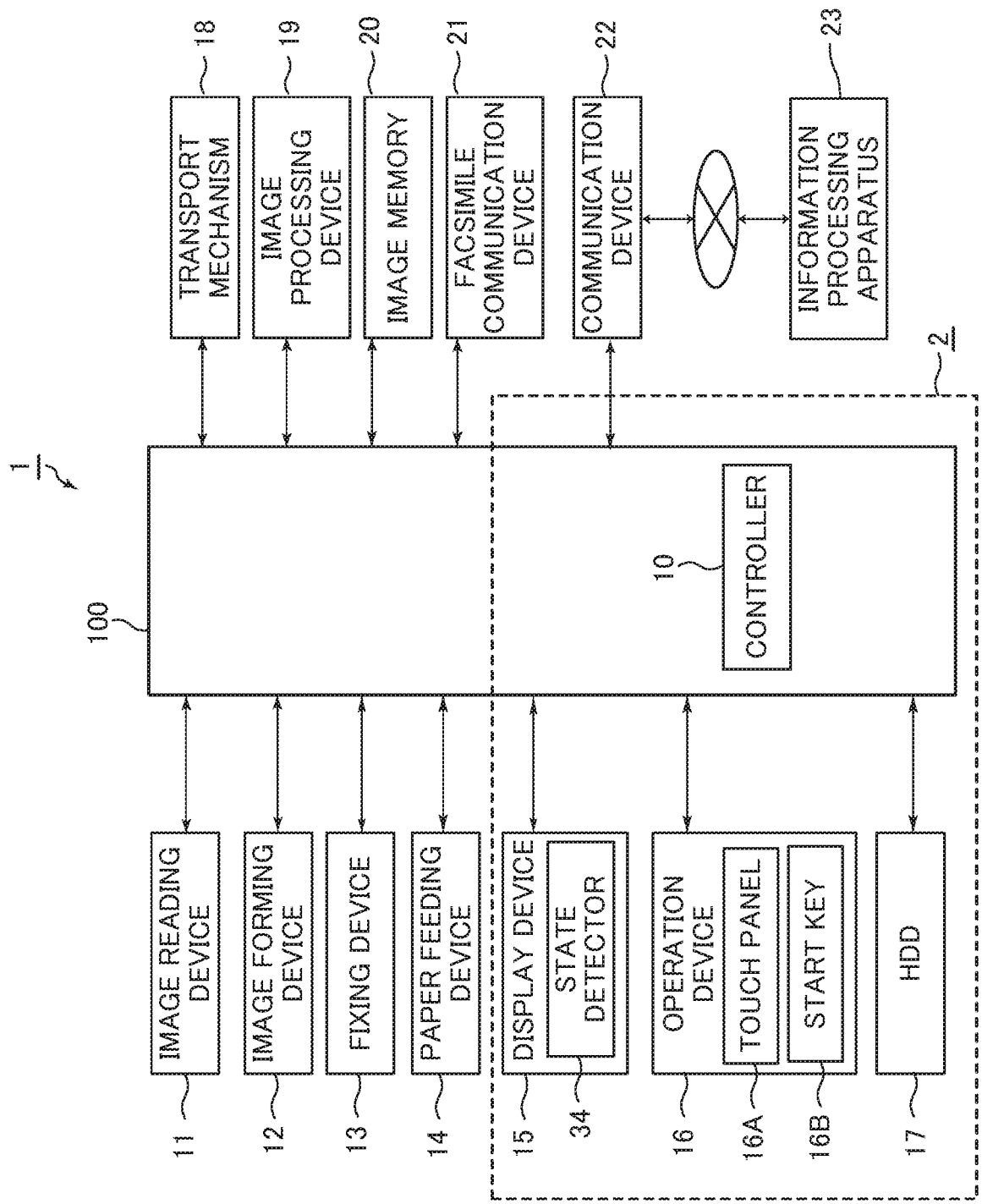
FIG. 2 is a block diagram showing an internal configuration of the image forming apparatus.

Hereafter, an image forming apparatus including an electronic device according to a first embodiment of the disclosure will be described, with reference to the drawings. FIG. 1 is a perspective view showing an appearance of the image forming apparatus. FIG. 2 is a block diagram showing an internal configuration of the image forming apparatus. Referring to FIG. 1 and FIG. 2, the image forming apparatus 1 is a color multifunction peripheral having a plurality of functions such as a facsimile function, a copying function, a printing function, and a transmission function.

The image forming apparatus 1 includes a control device 100. The control device 100 includes a processor, a random-access memory (RAM), and a read-only memory (ROM). The processor is, for example, a central processing device (CPU), a micro processing device (MPU), or an application specific integrated circuit (ASIC).

The control device 100 acts as a controller 10, when the processor executes a control program stored in the ROM or a hard disk drive (HDD) 17. The controller 10 controls the overall operation of the image forming apparatus 1. For example, the controller 10 causes the display device 15 to display individual information registered in advance in association with the user, or finish the display of the individual information, depending on whether the display device 15 is folded or opened. Here, the controller 10 may be constituted in the form of a hardware circuit, instead of being realized by the operation according to the control program.

The control device 100 is electrically connected to an image reading device 11, an image forming device 12, a fixing device 13, a paper feeding device 14, a display device 15, an operation device 16, the HDD 17, a transport mechanism 18, an image processing device 19, an image memory 20, a facsimile communication device 21, and a communication device 22. The control device 100, the display device 15, the operation device 16, and the HDD 17 act as an electronic device 2 according to the embodiments of the disclosure.

The image reading device 11 includes an automatic document feeder (ADF), having a document feeding device that transports a source document placed on a document table, and a scanner that optically reads the source document transported by the document feeding device, or placed on a platen glass. The image reading device 11 emits light to the source document from a light emitter, and receives the reflected light with a charge-coupled device (CCD) sensor, to thereby read the source document and generate image data.

The image forming device 12 includes a photoconductor drum, a charging device, an exposure device, a developing device, and a transfer device. The image forming device 12 forms a toner image on a recording sheet delivered from the paper feeding device 14, on the basis of the image data generated by the image reading device 11.

The fixing device 13 heats and presses the recording sheet on which the toner image has been formed by the image forming device 12, to thereby fix the toner image on the recording sheet. The recording sheet having the toner image fixed thereon by the fixing device 13 is discharged to an output tray 8.

The paper feeding device 14 includes a manual bypass tray and a paper cassette. The paper feeding device 14 draws out one by one the recording sheets stored in the paper cassette, or placed on the manual bypass tray, and feeds the recording sheets to the image forming device 12.

Figure 3A:
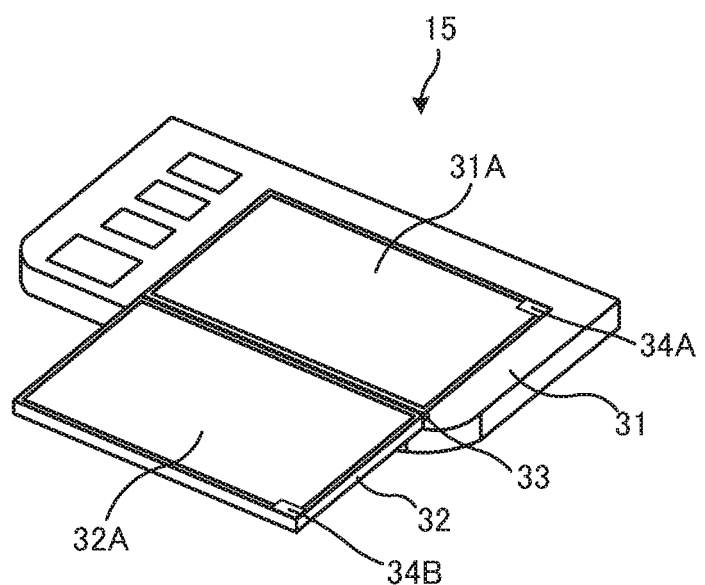
FIG. 3A is a perspective view showing a display device in an open state.
Figure 3B:
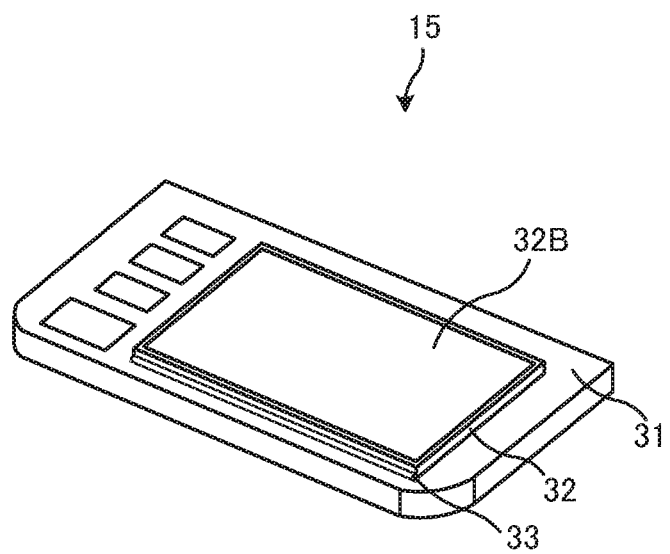
FIG. 3B is a perspective view showing the display device in a folded state.

FIG. 3A illustrates the display device 15 in an open state. FIG. 3B illustrates the display device 15 in a folded state. Referring to FIG. 3A, the display device 15 includes a first casing 31 of a generally rectangular parallelepiped shape, and a second casing 32 of a generally rectangular parallelepiped shape. A first display unit 31A is provided on one face of the first casing 31. A second display unit 32A is provided on one face (hereinafter, "first face") of the second casing 32. Referring to FIG. 3B, a third display unit 32B is provided on the other face of the second casing 32 opposite to the first face.

The first casing 31 and the second casing 32 are connected to each other via a rotary shaft 33 extending in the longitudinal direction of the first casing 31 and the second casing 32. The first casing 31 and the second casing 32 are configured to be folded about the rotary shaft 33, such that the display panel of the first display unit 31A and the display panel of the second display unit 32A are opposed to each other. Hereinafter, a state where the first casing 31 and the second casing 32 define an angle exceeding 90 degrees will be referred to as "open state" of the display device 15. In contrast, a state where the first casing 31 and the second casing 32 are folded, so as to define an angle equal to or narrower than 90 degrees, will be referred to as "closed state" of the display device 15.

The first display unit 31A, the second display unit 32A, and the third display unit 32B are, for example, each constituted of an LCD. When the display device 15 is in the open state as shown in FIG. 3A, the display panel of the first display unit 31A and the display panel of the second display unit 32A are exposed upward vertically of the display device 15, in other words toward the user. When the display device 15 is in the closed state as shown in FIG. 3B, the display panel of the third display unit 32B is exposed upward vertically of the display device 15, in other words toward the user.

The controller 10 designates, in advance, the display panel of the first display unit 31A and the display panel of the second display unit 32A as "first display panel". Likewise, the controller 10 designates in advance the display panel of the third display unit 32B "second display panel". The controller 10 causes the display device 15 to selectively display various screens related to the functions that the image forming apparatus 1 is configured to perform, on the first display panel or second display panel.

The display device 15 includes a state detector 34 that detects the closed state and the open state of the display device 15. The state detector 34 includes a Hall integrated circuit (IC) 34A provided in the first casing 31 and a magnet 34B provided in the second casing 32. The Hall IC 34A includes a Hall element that detects the level of density of the magnetic flux from the magnet 34B.

The Hall IC 34A outputs a first signal indicating that the display device 15 is in the open state, when the value indicating the magnetic flux density detected by the Hall element is equal to or lower than a predetermined threshold. When the value indicating the magnetic flux density detected by the Hall element is higher than the predetermined threshold, the Hall IC 34A outputs a second signal indicating that the display device 15 is in the closed state.

The operation device 16 includes a touch panel 16A, overlaid on each of the first display panel and the second display panel. The operation device 16 also includes a plurality of hard keys, such as a start key 16B for instructing the start of various operations. The user inputs various types of information, such as the instruction related to the functions that the image forming apparatus 1 is configured to perform, through the operation device 16. The operation device 16 exemplifies the input device in What is claimed is.

The HDD 17 is a large-capacity storage device for storing various types of data, including the image data generated by the image reading device 11. The HDD 17 contains various control programs to be used to realize basic operations of the image forming apparatus 1. One of the control programs stored in the HDD 17 is a modification program for performing the individual information displaying operation, according to the embodiments of the disclosure. The HDD 17 exemplifies the storage device in What is claimed is.

The user information for identifying the user is registered in advance in the HDD 17, in association with the user name and a password. In this embodiment, the user name composed of a character string representing "0123", and the password composed of a character string representing "ABCD" are registered in advance in the HDD 17, as an example of the user name and the password. The controller 10 stores the user name and the password in advance in the HDD 17, according to the input made by the user through the operation device 15.

In the HDD 17, the first individual information is stored, in association with the user name. The first individual information includes, for example, information indicating a predetermined function out of a plurality of functions that the image forming apparatus 1 is configured to perform, address book data containing e-mail addresses, memo pad data containing character strings representing memoranda, and information indicating electronic file names for identifying an electronic file. For example, as the information indicating the predetermined function, the information indicating the copying function, the transmission function, and the facsimile function, which are frequently utilized by the user, is stored in the HDD 17 in association with the user name of "0123".

The HDD 17 also contains second individual information, in association with the user name. The second individual information includes, for example, information indicating a predetermined setting detail about at least one of the plurality of functions that the image forming apparatus 1 is configured to perform, and memo pad data containing character strings representing memoranda. For example, as the information indicating the predetermined setting detail, information indicating a plurality of setting items frequently set by the user with respect to the copying function, is stored in the HDD 17, in association with the user name of "0123". The controller 10 stores the first individual information and the second individual information in advance in the HDD 17, according to the input made by the user through the operation device 15. The first individual information and the second individual information exemplify the first information in What is claimed is.

HDD 17 contains image data for displaying a home screen (hereinafter, simply "home screen"). The home screen is for selecting one of the plurality of functions that the image forming apparatus 1 is configured to perform. The HDD 17 also contains image data for displaying an authentication screen (hereinafter, simply "authentication screen"). The authentication screen is for inputting the user name and the password.

The HDD 17 further contains image data for displaying a setup screen (hereinafter, simply "setup screen"), in association with each of the plurality of functions that the image forming apparatus 1 is configured to perform. The setup screen is for specifying the setting detail with respect to the associated function. The home screen, the authentication screen, and the setup screen stored in the HDD 17 are not associated with the user name. The home screen, the authentication screen, and the setup screen exemplify the second information in What is claimed is.

The transport mechanism 18 includes a transport roller pair and a discharge roller pair. The transport mechanism 18 transports the recording sheet P the output tray 8 designated as the destination, along a transport route.

The image processing device 19 performs, if need be, image processing with respect to the image data generated by the image reading device 11.

The image memory 20 includes a region for temporarily storing the image data, generated by the image reading device 11 and representing the image to be outputted.

The facsimile communication device 21 makes connection to the public telephone network, to transmit and receive the image data through the public telephone network.

The communication device 22 includes a communication module such as a local area network (LAN) board. The image forming apparatus 1 performs data communication through the communication device 22, with an information processing apparatus 23 such as a personal computer (PC), connected via a network.

A power source is provided for each of the components in the image forming apparatus 1, so that the components of the image forming apparatus 1 perform the operation, with the power from the power source.

Operation

Figure 4A:
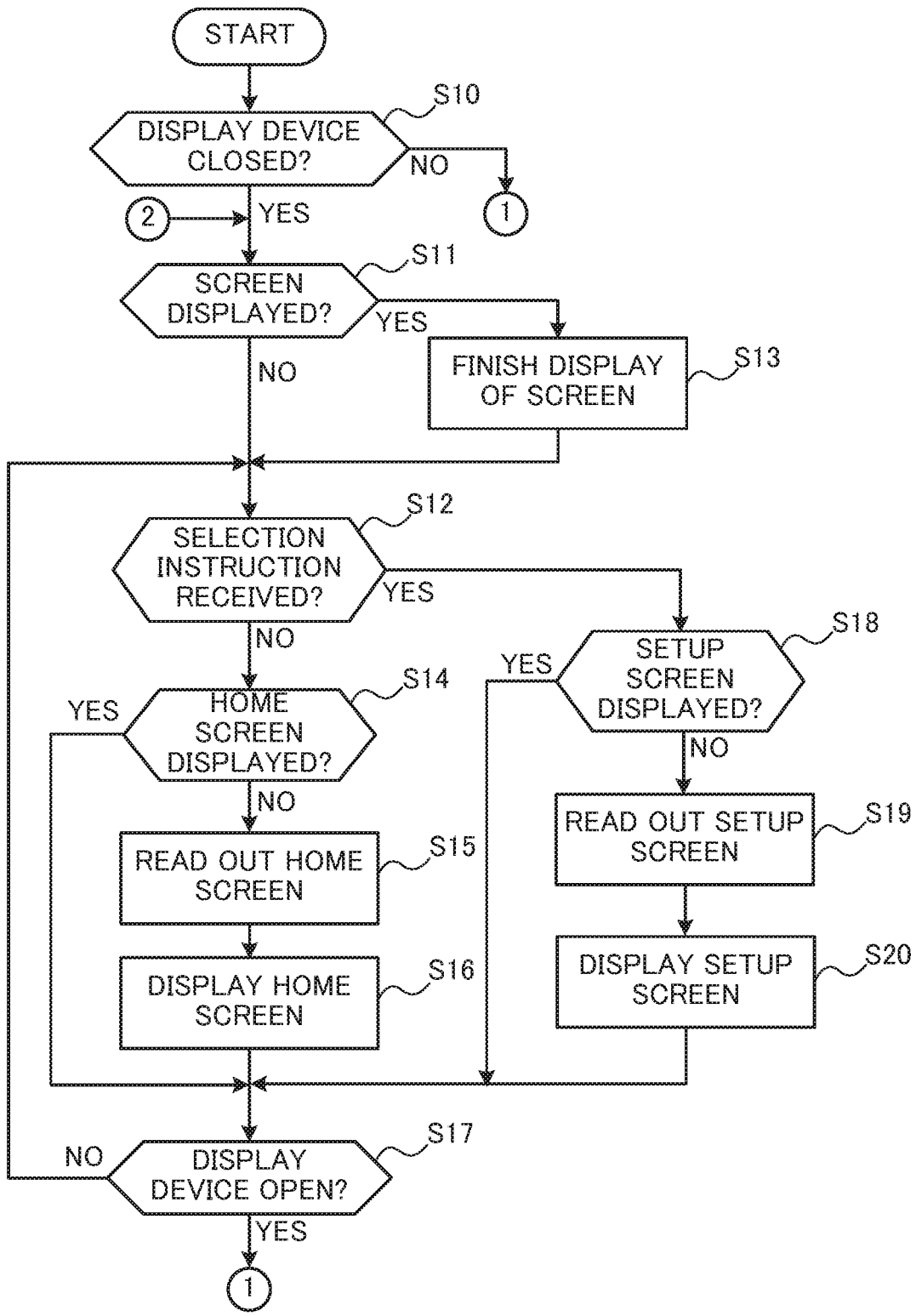
FIG. 4A is a flowchart for explaining an individual information displaying operation.
Figure 4B:
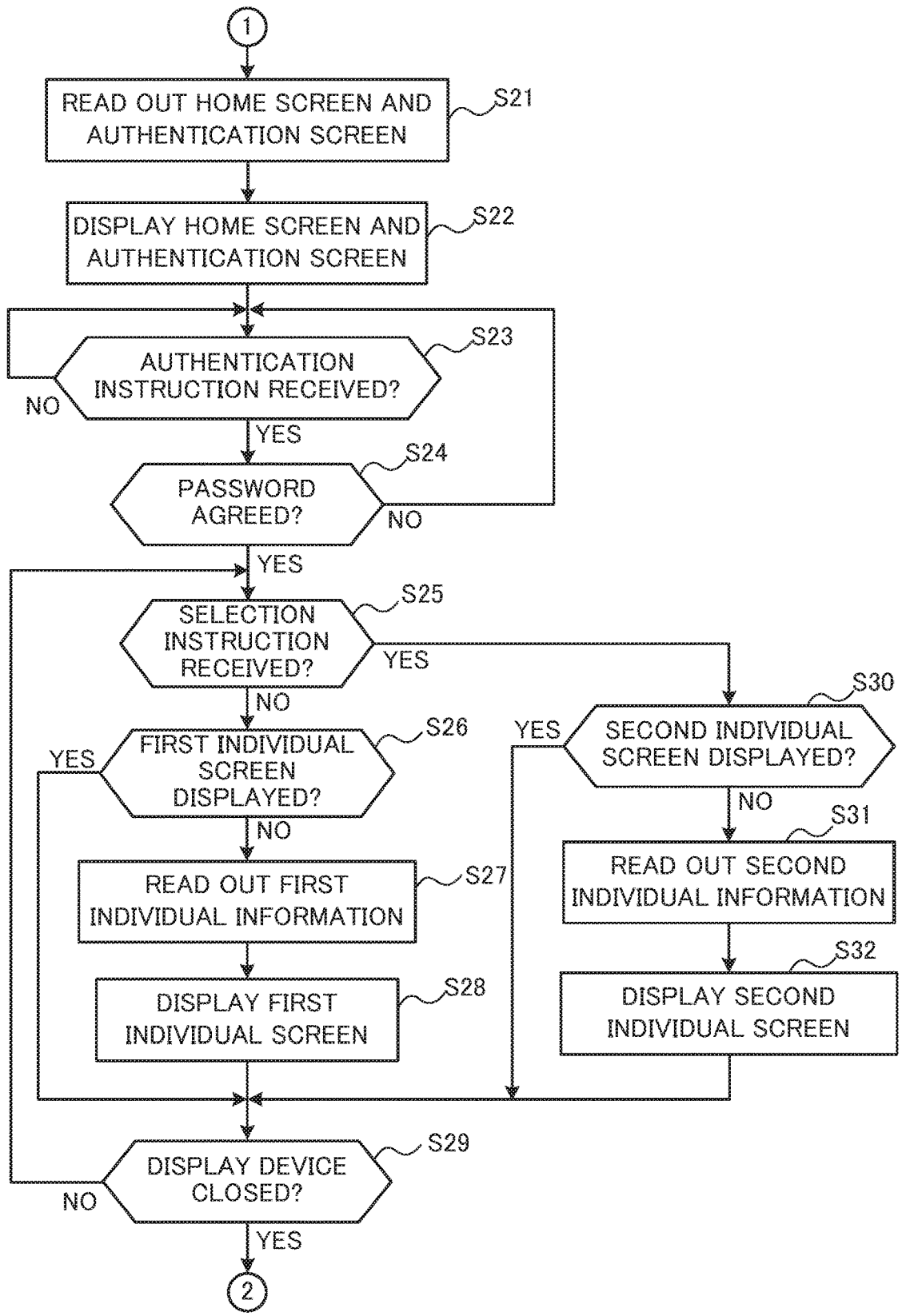
FIG. 4B is a flowchart for explaining the individual information displaying operation, subsequent to the process of FIG. 4A.

FIG. 4A and FIG. 4B are flowcharts each showing an individual information displaying operation. Referring to FIG. 4A and FIG. 4B, the operation performed by the image forming apparatus 1 to display the individual information will be described hereunder. It will be assumed hereafter, that the display device 15 is in the closed state, when the power for the image forming apparatus 1 is disconnected.

The user turns on the image forming apparatus 1, with the display device 15 kept closed. When the image forming apparatus 1 is turned on, the controller 10 starts the individual information displaying operation. Referring to FIG. 4A representing the individual information displaying operation, the controller 10 decides whether the display device 15 is in the closed state, according to the signal outputted from the state detector 34 (step S10).

(1) When Display Device 15 is Closed

Since the display device 15 is closed in this case, the controller 10 decides that the display device 15 is in the closed state, according to the second signal outputted from the state detector 34 (YES at step S10), and decides whether a screen is displayed on the first display unit 31A and the second display unit 32A (step S11).

At this point, nothing is displayed on the first display unit 31A and the second display unit 32A, and therefore the controller 10 decides that no screen is displayed (NO at step S11), and decides whether a selection instruction, for selecting one of the plurality of functions that the image forming apparatus 1 is configured to perform, has been received (step S12).

In contrast, when a screen is displayed on the first display unit 31A and the second display unit 32A (YES at step S11), the controller 10 finishes that display on the first display unit 31A and the second display unit 32A (step S13). After finishing the display, the controller 10 proceeds to step S12.

(1-1) When Selection Instruction is not Received

This is immediately after the image forming apparatus 1 has been turned on, where the user has not selected any of the functions. Therefore, the controller 10 decides that the selection instruction has not been received (NO at step S12), and decides whether the home screen is displayed on the third display unit 32B (step S14). Since nothing is displayed on the third display unit 32B at this point, the controller 10 decides that the home screen is not displayed (NO at step S14), and reads out the home screen from the HDD 17 (step S15).

After reading out the home screen, the controller 10 displays the home screen that has been read out, on the second display panel of the third display unit 32B (step S16). FIG. 5 illustrates an example of the home screen. Referring to FIG. 5, the controller 10 displays, as content of the home screen 50, a key 52 for inputting the selection of the copying function, and a key 54 for inputting the selection of the transmission function, which are soft keys, on the third display unit 32B.

After displaying the home screen 50, the controller 10 decides whether the display device 15 is in the open state, according to the signal outputted from the state detector 34 (step S17). Since the display device 15 is still closed at this point, the controller 10 decides that the display device 15 is not in the open state, according to the second signal outputted from the state detector 34 (NO at step S17), and proceeds to step S12.

Until the selection instruction is received, or until the display device 15 is opened, the controller 10 repeats the operation of deciding that the selection instruction has not been received (NO at step S12), deciding that the home screen is displayed (YES at step S14), and deciding that the display device 15 is not in the open state (NO at step S17), without performing the operation of step S15 and step S16.

(1-2) When Selection Instruction is Received

For example, the user touches the key 52, in view of the home screen 50. Upon detecting through the touch panel 16A that the key 52 has been touched, the controller 10 decides that the instruction to select the copying function has been received (YES at step S12), and decides whether the setup screen associated with the selected function is displayed on the third display unit 32B (step S18).

Since the home screen 50 is displayed on the third display unit 32B at this point, the controller 10 decides that the setup screen is not displayed (NO at step S18), and reads out the setup screen associated with the selected function, from the HDD 17 (step S19). More specifically, the controller 10 reads out the setup screen associated with the copying function, from the HDD 17. After reading out the setup screen, the controller 10 displays the setup screen read out as above, on the second display panel of the third display unit 32B (step S20).

FIG. 6 illustrates an example of the setup screen. Referring to FIG. 6, the controller 10 displays a key 61 for inputting an instruction to select a setting item of "paper selection", and a key 62 for inputting an instruction to select a setting item of "duplex printing", which are soft keys, on the setup screen 60 of the third display unit 32B. For example, when the user touches the key 62, the controller 10 detects through the touch panel 16A that the key 62 has been touched, and displays a screen for setting the detail about the item of "duplex printing", on the second display panel of the third display unit 32B.

The controller 10 also displays a key 63 for inputting an instruction to cancel the selection of the copying function, and a key 64 for inputting an instruction to confirm the setting detail, which are soft keys, on the setup screen 60 of the third display unit 32B. After displaying the setup screen 60, the controller 10 proceeds to step S17. Since the display device 15 is still closed at this point, the controller 10 decides that the display device 15 is not in the open state, according to the second signal outputted from the state detector 34 (NO at step S17), and proceeds to step S12.

Until the display device 15 is opened, or until the cancellation instruction is received, the controller 10 repeats the operation of deciding that the selection instruction has been received (YES at step S12), deciding that the setup screen 60 is displayed (YES at step S18), and deciding that the display device 15 is not in the open state (NO at step S17), without performing the operation of step S19 and step S20.

For example, the user touches the key 63, in view of the setup screen 60. Upon detecting through the touch panel 16A that the key 63 has been touched, thereby receiving the cancellation instruction, the controller 10 decides that the selection instruction has not been received (NO at step S12), and that the home screen is not displayed (NO at step S14), and performs the operation of step S15 and step S16 as above, thereby displaying the home screen 50 on the second display panel of the third display unit 32B. After displaying the home screen 50, the controller 10 repeats, as described above, the operation of deciding that the display device 15 is not in the open state (NO at step S17), deciding that the selection instruction has not been received (NO at step S12), and deciding that the home screen is displayed (YES at step S14).

(2) When Display Device 15 is Open

The user opens the display device 15, in view of the home screen 50 displayed on the second display panel. The controller 10 decides that the display device 15 is in the open state according to the first signal outputted from the state detector 34 (YES at step S17), and reads out the home screen and the authentication screen from the HDD 17, as shown in FIG. 4B (step S21). After reading out the home screen and the authentication screen, the controller 10 displays the home screen and the authentication screen that have been read out, on the first display panel, in other words on the first display unit 31A and the second display unit 32A (step S22). At the same time, the controller 10 finishes the display of the home screen 50 on the third display unit 32B.

Figure 7:
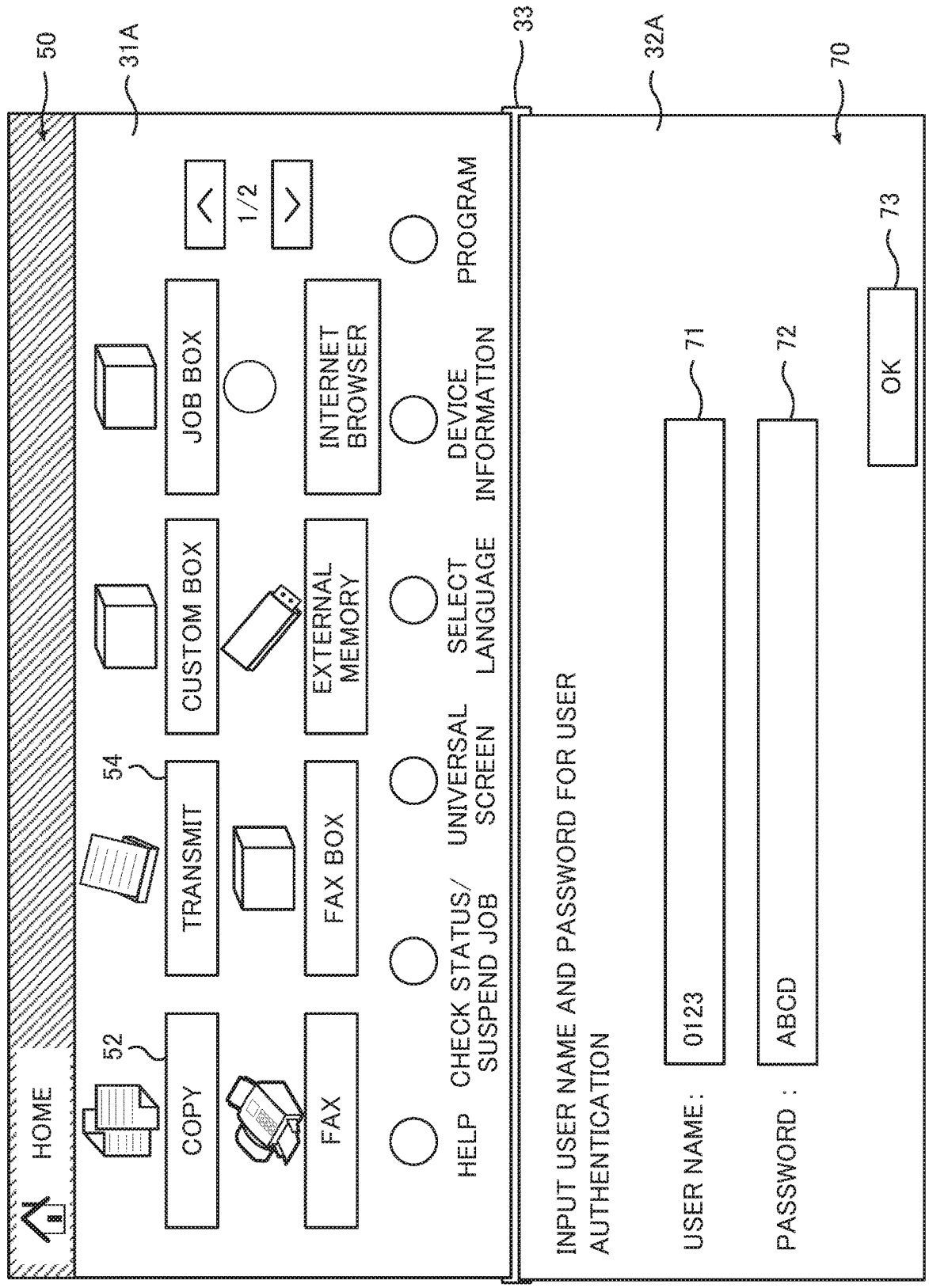
FIG. 7 is a schematic drawing showing the display device displaying the home screen and an authentication screen.

FIG. 7 illustrates the home screen and the authentication screen displayed on the display device. Referring to FIG. 7, the controller 10 displays the home screen 50 on the display panel of the first display unit 31A, and the authentication screen 70 on the display panel of the second display unit 32A. The controller 10 displays a field 71 for inputting the user name, and a field 72 for inputting the password, in the authentication screen 70 displayed on the second display unit 32A. The controller 10 also displays a key 73, which is a soft key, for inputting an instruction to execute the authentication, in the authentication screen 70 displayed on the second display unit 32A.

After displaying the home screen 50 and the authentication screen 70, the controller 10 stands by for an input of an authentication instruction (NO at step S23). Then the user inputs a character string representing "0123" in the field 71 as the user name, and inputs a character string representing "ABCD" in the field 72 as the password, through the operation device 16. Upon inputting the user name and the password, the user touches the key 73.

Upon detecting through the touch panel 16A that the key 73 has been touched, the controller 10 decides that the authentication instruction has been received (YES at step S23), and decides whether the password inputted through the touch panel 16A agrees with the password stored in the HDD 17 in association with the user name inputted through the touch panel 16A (step S24). In this example, the controller 10 decides that the password that has been inputted and the password stored in the HDD 17 agree with each other (YES at step S24), and decides whether the selection instruction has been received (step S25).

Here, for example a character string "0123" is inputted in the field 71 as the user name, and a character string "BCDE" is inputted in the field 72 as the password, the controller 10 decides that the password that has been inputted and password stored in the HDD 17 in association with the user name that has been inputted disagree with each other (NO at step S24), and returns to step S23. At this point, the controller 10 may display such a message as "Wrong password. Please input again", on the authentication screen 70 on the second display unit 32A.

(2-1) When Selection Instruction is not Received

Since the selection of the function is cancelled at this point, the controller 10 decides that the selection instruction has not been received (NO at step S25), and decides whether a first individual screen is displayed on the second display unit 32A (step S26). Since the authentication screen 70 is currently displayed on the second display unit 32A, the controller 10 decides that the first individual screen is not displayed (NO at step S26), and reads out the first individual information associated with the user name that has been inputted, from the HDD 17 (step S27).

Figure 8:
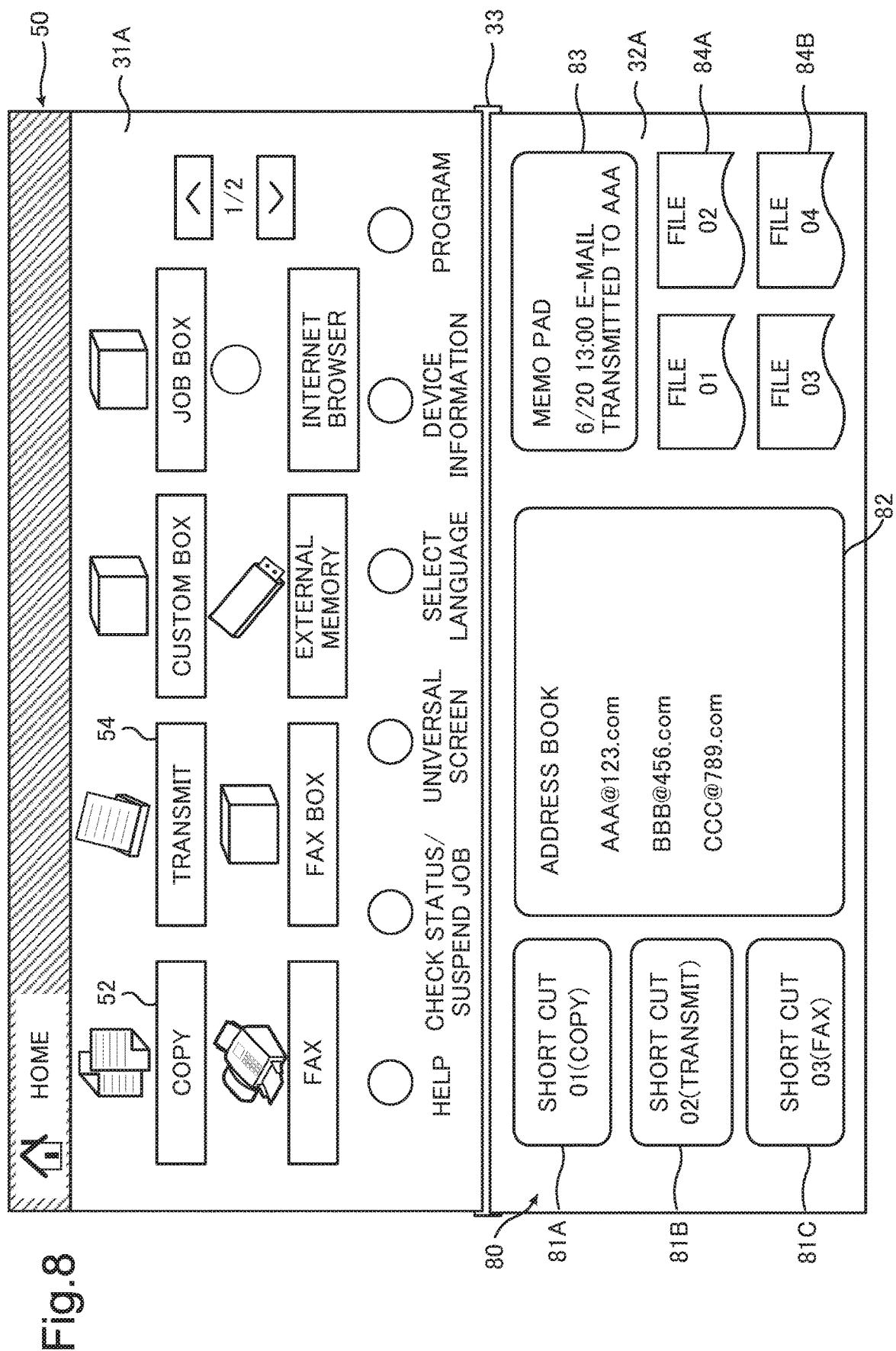
FIG. 8 is a schematic drawing showing the display device displaying the home screen and a first individual screen.

After reading out the first individual information, the controller 10 displays a first individual screen showing the first individual information that has been read out, on the first display panel of the second display unit 32A (step S28). FIG. 8 illustrates the home screen and the first individual screen displayed on the display device. Referring to FIG. 8, the controller 10 displays the home screen 50 on the display panel of the first display unit 31A, and finishes the display of the authentication screen 70 on the second display unit 32A, displaying instead the first individual screen 80 on the display panel of the second display unit 32A.

The controller 10 displays short-cut keys 81A to 81C, which are soft keys, each associated with a function registered as first individual information, on the first individual screen 80 of the second display unit 32A. Here, it will be assumed that the copying function is associated with the short-cut key 81A, that the transmission function is associated with the short-cut key 81B, and that the facsimile function is associated with the short-cut key 81C.

The controller 10 displays e-mail addresses according to the address book data registered as the first individual information, in a section 82 of the first individual screen 80 of the second display unit 32A. The controller 10 displays a character string indicated by the memo pad data registered as the first individual information, in a section 83 of the first individual screen 80 of the second display unit 32A. The controller 10 also displays keys 84A, 84B, and so forth, which are soft keys, each associated with an electronic file to be identified by an electronic file name registered as the first individual information, on the second display unit 32A.

After displaying the first individual screen 80, the controller 10 decides whether the display device 15 is in the closed state, according to the signal outputted from the state detector 34 (step S29). Since the display device 15 is still open at this point, the controller 10 decides that the display device 15 is in the closed state, according to the first signal outputted from the state detector 34 (NO at step S29), and proceeds to step S25.

Until the selection instruction is received, or until the display device 15 is closed, the controller 10 repeats the operation of deciding that the selection instruction has not been received (No at step S25), deciding that the first individual screen is displayed (YES at step S26), and deciding that the display device 15 is not in the closed state (NO at step S29), without performing the operation of step S27 and step S28.

Here, when the user closes the display device 15, and the controller 10 decides that the display device 15 is in the closed state, according to the signal outputted from the state detector 34 (YES at step S29), the controller 10 proceeds to step S11.

(2-2) When Selection Instruction is Received

The user touches the short-cut key 81A, in view of the first individual screen 80. Upon detecting through the touch panel 16A that the short-cut key 81A has been touched, the controller 10 decides that the instruction to select the copying function has been received (YES at step S25), and decides whether a second individual screen is displayed on the second display unit 32A (step S30).

Since the first individual screen 80 is currently displayed on the second display unit 32A, the controller 10 decides that the second individual screen is not displayed (NO at step S30), and reads out the setup screen, and the second individual information associated with the user name that has been inputted, from the HDD 17 (step S31).

Figure 9:
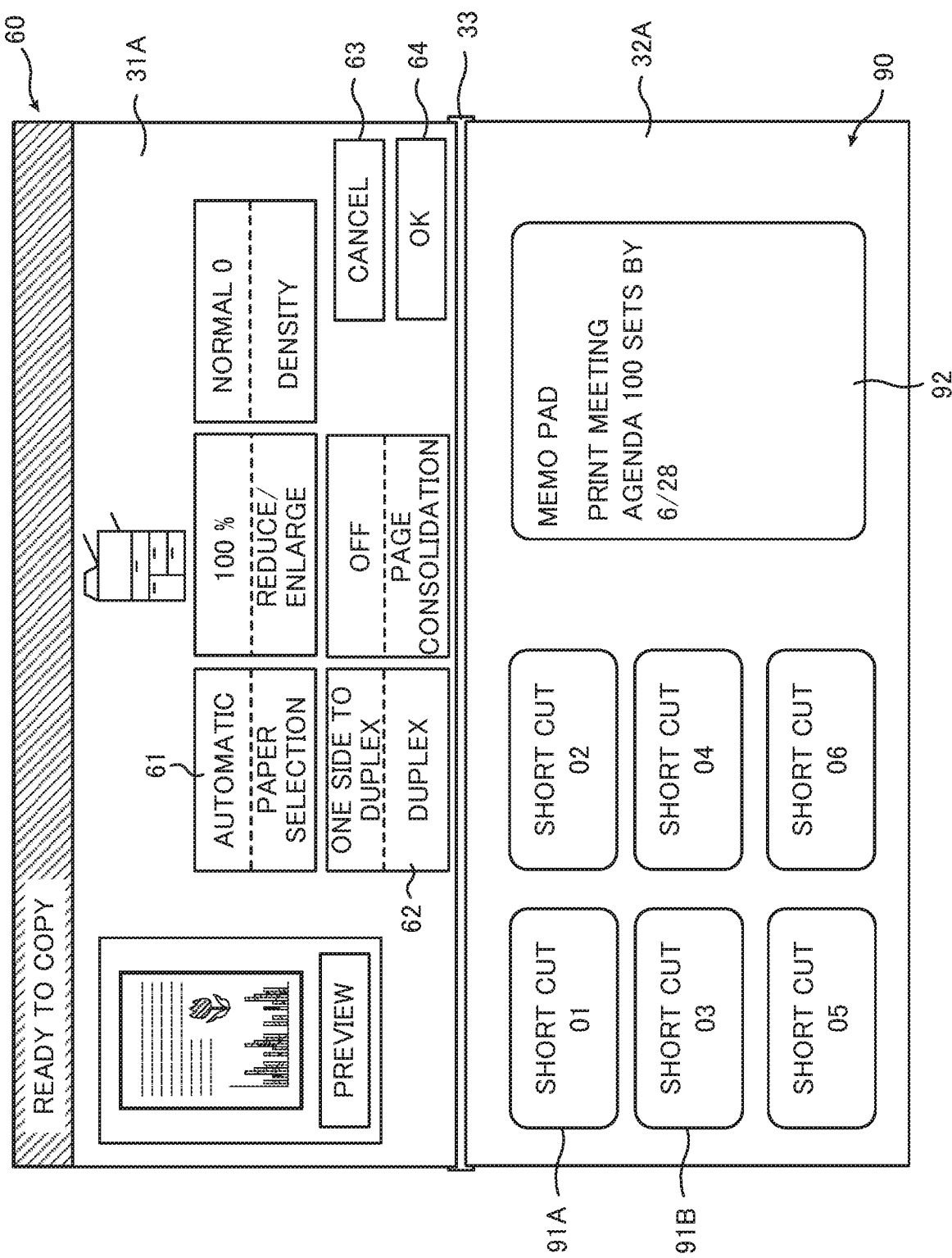
FIG. 9 is a schematic drawing showing the display device displaying the setup screen and a second individual screen.

After reading out the second individual information, the controller 10 displays the setup screen 60 that has been read out, and the second individual screen showing the second individual information that has been read out, on the first display panel, in other words on the first display unit 31A and the second display unit 32A. FIG. 9 illustrates the setup screen and the second individual screen displayed on the display device. Referring to FIG. 9, the controller 10 displays the setup screen 60 on the display panel of the first display unit 31A. The controller 10 also displays the second individual screen 90 on the display panel of the second display unit 32A.

The controller 10 displays short-cut keys 91A, 91B, and so forth, which are soft keys, respectively associated with a plurality of setting items registered as the second individual information, on the second individual screen 90 of the second display unit 32A. The controller 10 also displays a character string indicated by the memo pad data registered as the second individual information, in a section 92 of the second individual screen 90 of the second display unit 32A.

After displaying the second individual screen 90, the controller 10 decides whether the display device 15 is in the closed state, according to the signal outputted from the state detector 34 (step S29). Since the display device 15 is still open at this point, the controller 10 decides that the display device 15 is not in the closed state, according to the first signal outputted from the state detector 34 (NO at step S29), and proceeds to step S25.

Until the selection instruction is cancelled, or until the display device 15 is closed, the controller 10 repeats the operation of deciding that the selection instruction has been received (YES at step S25), deciding that the second individual screen is displayed (YES at step S30), and deciding that the display device 15 is not in the closed state (NO at step S29), without performing the operation of step S31 and step S32.

The user touches the key 64 on the setup screen 60, after touching the short-cut key 91A on the second individual screen 90. Upon detecting through the touch panel 16A that the key 64 has been touched, the controller 10 accepts the setting detail associated with the short-cut key 91A, as the confirmed setting detail. After touching the key 64, the user places a source document on the platen glass of the image reading device 11, and presses the start key 16B to start the copying operation.

Upon detecting that the start key 16B has been pressed, the controller 10 causes the image reading device 11 to read the source document placed on the platen glass, and generate the image data, in accordance with the setting detail confirmed as above. After the image data is generated, the controller 10 causes the image forming device 12 to form the image based on the image data on a recording sheet, in accordance with the confirmed setting detail.

Now, with an apparatus configured to perform a plurality of functions, the user may register in advance various types of information, such as the functions, setting detail, and e-mail addresses, which are frequently used, and retrieve the registered information when necessary, to a display.

In this case, the user has to perform, for example, a touch operation on the touch panel, to display the information registered in advance in association with the user, or finish the display of the registered information, which is troublesome. In addition, in the case where the user temporarily moves away from the display with the registered information being kept displayed, without performing the touch operation to finish the display, the registered information may be viewed by a third party other than the user.

The mentioned existing technique is merely for utilizing the display designed to be folded, and not the technique intended to display the preregistered information. Therefore, the mentioned drawbacks are unable to be solved, by the existing technique.

With the technique according to the first embodiment, in contrast, the controller 10 displays the first individual screen 80 or the second individual screen 90 on the first display panel of the second display unit 32A, when the open state is detected by the state detector 34, and the password stored in the HDD 17 in association with the user name that has been inputted and the password received through the operation device 16 agree with each other. However, the controller 10 restricts the display device 15 from displaying the first individual screen 80 and the second individual screen 90, when the open state is detected by the state detector 34 but the passwords disagree, or when the closed state is detected by the state detector 34.

Accordingly, the user can view the first individual screen 80 or the second individual screen 90 displayed on the first display panel, simply by opening the display device 15, and therefore the user can easily confirm the first individual information or the second individual information, preregistered in association with the user information. In addition, the first individual screen 80 and the second individual screen 90 are restricted from being displayed when the passwords disagree, even though the display device 15 is opened. Therefore, the first individual information and the second individual information can be securely prevented from being viewed by a third party. Further, the user can restrict the display device 15 from displaying the first individual screen 80 or the second individual screen 90, simply by folding the display device 15. Therefore, the user can easily prevent the first individual information and the second individual information from being viewed by a third party.

With the configuration according to the first embodiment, the controller 10 causes the display device 15 to display the home screen 50 or the setup screen 60 on the second display panel, when the closed state is detected by the state detector 34. Accordingly, the user can easily confirm common information that is not associated with the user information, simply by folding the display device 15.

With the configuration according to the first embodiment, in addition, the controller 10 displays the short-cut keys 81A to 81C in the first individual screen 80 displayed on the display unit 32A, when the open state is detected by the state detector 34, and the passwords agree with each other, and also when the selection instruction has not been received. Therefore, the user can easily confirm the functions registered in advance as frequently-used functions, simply by opening the display device 15, when none of the plurality of functions is selected.

With the configuration according to the first embodiment, further, the controller 10 displays the short-cut keys 91A, 91B, and so forth, in the second individual screen 90 displayed on the display unit 32A, when the open state is detected by the state detector 34, and the passwords agree with each other, and also when the selection instruction has been received. Therefore, when the user selects one of the plurality of functions, the user can easily confirm the setting detail with respect to the selected function, registered in advance as frequently-used setting detail, simply by opening the display device 15.

Further, since the electronic device 2 is provided on the image forming apparatus 1 in the first embodiment, the image forming apparatus 1 provides upgraded user-friendliness.

First Variation

Although a single password is stored in the HDD 17 in association with the user name in the first embodiment, the disclosure is not limited to such an embodiment. In a first variation of the disclosure, the HDD 17 stores therein a first password and a second password in association with the user name, as the user information.

In the HDD 17, the first individual information is classified between information of a high security level (hereinafter, "high-level information"), and information of a low security level (hereinafter, "low-level information"). In this variation, the information indicating the address book data, the memo pad data, and the electronic file names, out of the first individual information, is stored as the high-level information, and the information indicating the predetermined functions is stored as the low-level information, in the HDD 17.

The second individual information is also classified between the high-level information and the low-level information, in the HDD 17. In this variation, the memo pad data is stored as the high-level information out of the second individual information, and the information indicating the predetermined setting detail is stored as the low-level information, in the HDD 17.

In the first variation, controller 10 reads out, from the HDD 17, only the low-level information out of the first individual information or the second individual information, associated with the user name inputted through the touch panel 16A (step S27 or step S31), when the open state is detected by the state detector 34 (YES at step S10 or step S17), and the first password stored in the HDD 17 and the password inputted through the touch panel 16A agree with each other (YES at step S24).

The controller 10 displays the first individual screen or the second individual screen, showing only the low-level information that has been read out, on the first display panel of the second display unit 32A (step S28 or step S32). In this case, the controller 10 displays only the short-cut keys 81A to 81C in the first individual screen, or only the short-cut keys 91A, 91B, and so forth in the second individual screen.

In contrast, when the open state is detected by the state detector 34 (YES at step S10 or step S17), and the second password stored in the HDD 17 and the password inputted through the touch panel 16A agree with each other (YES at step S24), the controller 10 reads out, from the HDD 17, the entirety of the first individual information or the second individual information, in other words both of the high-level information and the low-level information, associated with the user name inputted through the touch panel 16A (step S27 or step S31).

The controller 10 displays the first individual screen 80 or the second individual screen 90, showing both of the high-level information and the low-level information that have been read out, on the first display panel of the second display unit 32A (step S28 or step S32).

With the arrangement according to the first variation, the user can change the content of the individual information to be displayed, by using different passwords as the case may be. Therefore, the portion of the individual information that should be concealed can be prevented from being viewed by a third party, which leads to improved user-friendliness of the apparatus.

Second Embodiment

Although the electronic device 2 is provided in the image forming apparatus 1 in the first embodiment, the disclosure is not limited to such a configuration. A second embodiment of the disclosure is different from the first embodiment, in that the electronic device is additionally provided, independently from the image forming apparatus 1 according to the first embodiment. Hereunder, a terminal device, exemplifying the electronic device according to the second embodiment of the disclosure, will be described with reference to the drawings.

Figure 10:
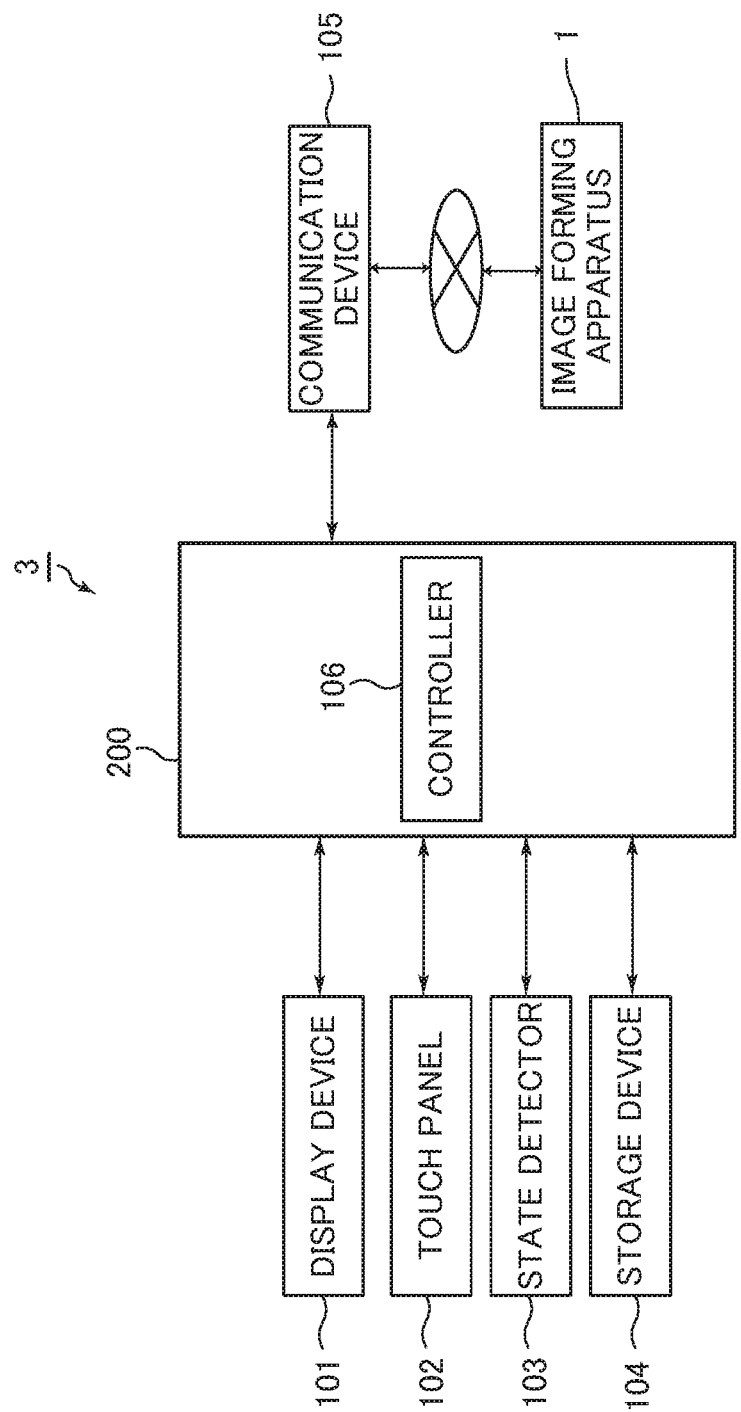
FIG. 10 is a block diagram showing an internal configuration of a terminal device.

FIG. 10 is a block diagram showing an internal configuration of the terminal device. Referring to FIG. 10, the terminal device 3 is a tablet-type display unit. The terminal device 3 includes a control device 200. The control device 200 is electrically connected to a display device 101, a touch panel 102, a state detector 103, a storage device 104, and a communication device 105.

The control device 200 includes a processor, a RAM, and a ROM. The processor is, for example, a CPU, a MPU, or an ASIC. The control device 200 acts as a controller 106, when the processor executes a control program stored in the ROM or the storage device 104.

The controller 106 controls the overall operation of the terminal device 3. For example, the controller 106 causes the display device 101 to display individual information registered in advance in association with the user, or finish the display of the individual information, depending on whether the display device 101 is folded or opened. The controller 106 also controls a communication with the image forming apparatus 1 connected via a network. Here, the controller 106 may be constituted in the form of a hardware circuit, instead of being realized by the operation according to the control program.

Figure 11A:
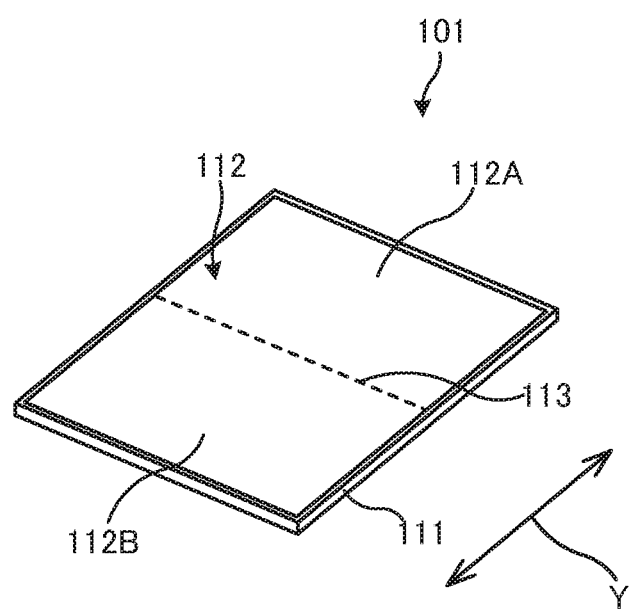
FIG. 11A is a perspective view showing a display device in an open state.
Figure 11B:
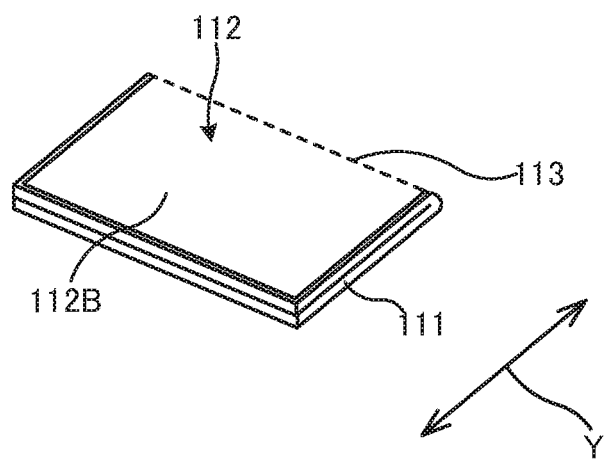
FIG. 11B is a perspective view showing the display device in a folded state.

FIG. 11A illustrates the display device in the open state. FIG. 11B illustrates the display device in the folded state. Referring to FIG. 11A, the display device 101 includes a casing 111 of a generally rectangular parallelepiped shape. On one face of the casing 111, a display unit 112 is provided. The display unit 112 is, for example, constituted of an LCD.

The touch panel 102 is overlaid on the display unit 112. The user inputs various types of information, such as the instruction related to the functions that the terminal device 3 is configured to perform, through the touch panel 102. The touch panel 102 exemplifies the input device in What is claimed is.

Referring to FIG. 11B, the casing 111, the display unit 112, and the touch panel 102 are configured to be folded about a center line 113, such that the display panel of the display unit 112 is outwardly exposed. The display panel of the display unit 112 is divided, by being folded, into a display region 112A on the side of one end portion in a direction Y orthogonal to the center line 113, and a display region 112B on the side of the other end portion in the direction Y.

Hereinafter, a state where the display region 112A and the display region 112B define an angle exceeding 90 degrees will be referred to as "open state" of the display device 101. In contrast, a state where the display region 112A and the display region 112B are folded, so as to define an angle equal to or narrower than 90 degrees, will be referred to as "closed state" of the display device 101.

The controller 106 designates, in advance, the entirety of the display panel of the display unit 112, in other words the display region 112A and the display region 112B, as "first display panel". For example, when the display device 101 is in the open state as shown in FIG. 11A, the first display panel is exposed upward vertically of the terminal device 3.

The controller 106 also designates the display region 112A and the display region 112B, exposed upward vertically of the terminal device 3 when the display device 101 is in the closed state, as "second display panel". For example, when the display device 101 is closed as shown in FIG. 11B, the display region 112B is exposed upward vertically of the terminal device 3, and therefore the controller 10 designates the display region 112B as "second display panel".

The controller 106 causes the display device 101 to selectively display various screens related to the functions that the image forming apparatus 1 is configured to perform, on the first display panel or second display panel.

The state detector 103 includes a triaxial acceleration sensor. The triaxial acceleration sensor detects the movement of the display device 101 in the triaxial direction as acceleration, and outputs a signal indicating the acceleration detected.

The storage device 104 is, for example, a flash memory. The storage device 104 contains various control programs to be used to realize basic operations of the terminal device 3. One of the control programs stored in the storage device 104 is a modification program for performing the individual information displaying operation, similar to that of the first embodiment.

The user information is stored in advance in the storage device 104, in association with the user name and the password. In this embodiment, the user name composed of a character string representing "0123", and the password composed of a character string representing "ABCD" are registered in advance in the storage device 104, as an example of the user name and the password. The user registers the user name and the password in advance, by inputting through the touch panel 102.

The storage device 104 contains the first individual information, in association with the user name. The first individual information includes, for example, information indicating predetermined functions, address book data, memo pad data, and information indicating electronic file names. For example, as the information indicating the predetermined functions, the information indicating the copying function, the transmission function, and the facsimile function, which are frequently utilized by the user, is stored in the storage device 104.

The storage device 104 also contains the second individual information, in association with the user name. The second individual information includes, for example, information indicating a predetermined setting detail about at least one of the plurality of functions, and the memo pad data. For example, as the information indicating the predetermined setting detail, information indicating a plurality of setting items frequently set by the user with respect to the copying function, is stored in the storage device 104. The first individual information and the second individual information are registered in advance in the storage device 104, according to the input made by the user through the touch panel 102.

The storage device 104 contains the home screen and the authentication screen. The storage device 104 also contains the setup screen, in association with each of the plurality of functions that the image forming apparatus 1 is configured to perform. The home screen, the authentication screen, and the setup screen stored in the storage device 104 are not associated with the user name.

The communication device 105 includes a communication module. The terminal device 3 performs data communication through the communication device 105, with the image forming apparatus 1 connected via a network.

A power source is provided for each of the components in the terminal device 3, so that the components of the terminal device 3 perform the operation, with the power from the power source.

Operation

Referring to FIG. 4A and FIG. 4B, the operation performed by the terminal device 3 to display the individual information will be described hereunder. It will be assumed hereafter, that the display device 101 is in the closed state, when the power for the terminal device 3 is disconnected.

The user turns on the terminal device 3, with the display device 101 kept closed. When the terminal device 3 is turned on, the controller 10 starts the individual information displaying operation. Referring to FIG. 4A representing the individual information displaying operation, the controller 10 decides whether the display device 101 is in the closed state, according to the signal outputted from the state detector 103 (step S10).

To be more detailed, the controller 106 calculates the angle defined between the display region 112A and the display region 112B, according to the signal outputted from the state detector 103, and decides that the display device 101 is in the open state, when the calculated angle exceeds 90 degrees. When the calculated angle is equal to or narrower than 90 degrees, the controller 106 decides that the display device 101 is in the closed state.

(1) When Display Device 101 is Closed

Since the display device 101 is closed in this case, the controller 106 decides that the display device 101 is in the closed state, according to the signal outputted from the state detector 103 (YES at step S10), and decides whether a screen is displayed on the display unit 112 (step S11).

At this point, nothing is displayed on the display unit 112, and therefore the controller 106 decides that no screen is displayed (NO at step S11), and decides whether a selection instruction, for selecting one of the plurality of functions that the image forming apparatus 1 is configured to perform, has been received (step S12).

In contrast, when a screen is displayed on the display unit 112 (YES at step S11), the controller 106 finishes that display on the display unit 112 (step S13). After finishing the display, the controller 106 proceeds to step S12.

(1-1) When Selection Instruction is not Received

This is immediately after the terminal device 3 has been turned on, where the user has not selected any of the functions. Therefore, the controller 106 decides that the selection instruction has not been received (NO at step S12), and decides whether the home screen is displayed on the display unit 112 (step S14). Since nothing is displayed on the display unit 112 at this point, the controller 106 decides that the home screen is not displayed (NO at step S14), and reads out the home screen from the storage device 104 (step S15).

After reading out the home screen, the controller 106 displays the home screen that has been read out, on the second display panel of the display unit 112 (step S16). To be more detailed, the controller 106 identifies the display region 112A or the display region 112B, whichever is exposed upward vertically of the terminal device 3, according to the signal outputted from the state detector 103, and designates the display region 112A or the display region 112B thus identified, as the second display panel. The controller 106 displays the home screen 50, on the display region 112A or the display region 112B designated as the second display panel.

After displaying the home screen 50, the controller 106 decides whether the display device 101 is in the open state, according to the signal outputted from the state detector 103 (step S17). Since the display device 101 is still kept closed at this point, the controller 106 decides that the display device 101 is not in the open state, according to the signal outputted from the state detector 103 (NO at step S17), and proceeds to step S12.

Until the selection instruction is received, or until the display device 101 is opened, the controller 106 repeats the operation of deciding that the selection instruction has not been received (NO at step S12), deciding that the home screen is displayed (YES at step S14), and deciding that the display device 101 is not in the open state (NO at step S17), without performing the operation of step S15 and step S16.

(1-2) When Selection Instruction is Received

For example, the user touches the key 52, in view of the home screen 50. Upon detecting through the touch panel 102 that the key 52 has been touched, the controller 106 decides that the instruction to select the copying function has been received (YES at step S12), and decides whether the setup screen associated with the selected function is displayed on the display unit 112 (step S18).

Since the home screen 50 is displayed on the display unit 112 at this point, the controller 106 decides that the setup screen is not displayed (NO at step S18), and reads out the setup screen associated with the selected function, from the storage device 104 (step S19). In this example, the controller 106 reads out the setup screen 60 associated with the copying function, from the storage device 104. After reading out the setup screen 60, the controller 106 displays the setup screen 60 read out as above, on the second display panel of the display unit 112 (step S20).

After displaying the setup screen 60, the controller 106 proceeds to step S17. Since the display device 101 is still kept closed at this point, the controller 106 decides that the display device 101 is not in the open state, according to the signal outputted from the state detector 103 (NO at step S17), and proceeds to step S12.

Until the display device 101 is opened, or until the cancellation instruction is received, the controller 106 repeats the operation of deciding that the selection instruction has been received (YES at step S12), deciding that the setup screen 60 is displayed (YES at step S18), and deciding that the display device 101 is not in the open state (NO at step S17), without performing the operation of step S19 and step S20.

For example, the user touches the key 63, in view of the setup screen 60. Upon detecting through the touch panel 102 that the key 63 has been touched, thereby receiving the cancellation instruction, the controller 106 decides that the selection instruction has not been received (NO at step S12), and that the home screen is not displayed (NO at step S14), and performs the operation of step S15 and step S16 as above, thereby displaying the home screen 50 on the second display panel of the display unit 112. After displaying the home screen 50, the controller 106 repeats, as described above, the operation of deciding that the display device 101 is not in the open state (NO at step S17), deciding that the selection instruction has not been received (NO at step S12), and deciding that the home screen is displayed (YES at step S14).

(2) When Display Device 101 is Open

The user opens the display device 101, in view of the home screen 50 displayed on the second display panel. The controller 106 decides that the display device 101 is in the open state according to the signal outputted from the state detector 103 (YES at step S17), and reads out the home screen and the authentication screen from the storage device 104, as shown in FIG. 4B (step S21). After reading out the home screen and the authentication screen, the controller 106 displays the home screen and the authentication screen that have been read out, on the first display panel of the display unit 112 (step S22). At the same time, the controller 106 finishes the display of the home screen 50 thus far displayed on the second display panel of the display unit 112.

At step S22, the controller 106 displays the home screen 50 on the display region 112A of the display unit 112, and the authentication screen 70 on the display region 112B of the display unit 112. After displaying the home screen 50 and the authentication screen 70, the controller 106 stands by for an input of the authentication instruction (NO at step S23). Then the user inputs a character string representing "0123" in the field 71 as the user name, and inputs a character string representing "ABCD" in the field 72 as the password, through the touch panel 102. Upon inputting the user name and the password, the user touches the key 73.

Upon detecting through the touch panel 102 that the key 73 has been touched, the controller 106 decides that the authentication instruction has been received (YES at step S23), and decides whether the password inputted through the touch panel 102 agrees with the password stored in the storage device 104 in association with the user name inputted through the touch panel 102 (step S24). In this example, the controller 106 decides that the password that has been inputted and the password stored in the storage device 104 agree with each other (YES at step S24), and decides whether the selection instruction has been received (step S25).

Here, for example a character string "0123" is inputted in the field 71 as the user name, and a character string "BCDE" is inputted in the field 72 as the password, the controller 106 decides that the password that has been inputted, and the password stored in the storage device 104 in association with the user name that has been inputted disagree with each other (NO at step S24), and returns to step S23. At this point, the controller 106 may display such a message as "Wrong password. Please input again", on the authentication screen 70.

(2-1) When Selection Instruction is not Received

Since the selection of the function is cancelled at this point, the controller 106 decides that the selection instruction has not been received (NO at step S25), and decides whether the first individual screen is displayed on the display unit 112 (step S26). Since the authentication screen 70 is currently displayed on the display unit 112, the controller 106 decides that the first individual screen is not displayed (NO at step S26), and reads out the first individual information associated with the user name that has been inputted, from the storage device 104 (step S27).

After reading out the first individual information, the controller 106 displays the first individual screen 80 showing the first individual information that has been read out, on the first display panel of the display unit 112 (step S28). At this point, the controller 106 displays the home screen 50 on the display region 112A of the display unit 112. Accordingly, the controller 106 finishes the display of the authentication screen 70 on the display unit 112, displaying instead the first individual screen 80 on the display region 112B of the display unit 112.

After displaying the first individual screen 80, the controller 106 decides whether the display device 101 is in the closed state, according to the signal outputted from the state detector 103 (step S29). Since the display device 101 is kept open at this point, the controller 106 decides that the display device 101 is not in the closed state, according to the signal outputted from the state detector 103 (NO at step S29), and proceeds to step S25.

Until the selection instruction is received, or until the display device 101 is closed, the controller 106 repeats the operation of deciding that the selection instruction has not been received (No at step S25), deciding that the first individual screen is displayed (YES at step S26), and deciding that the display device 101 is not in the closed state (NO at step S29), without performing the operation of step S27 and step S28.

Here, when the user closes the display device 101, and the controller 106 decides that the display device 101 is in the closed state, according to the signal outputted from the state detector 103 (YES at step S29), the controller 106 proceeds to step S11.

(2-2) When Selection Instruction is Received

The user touches the short-cut key 81A, in view of the first individual screen 80. Upon detecting through the touch panel 102 that the short-cut key 81A has been touched, the controller 106 decides that the instruction to select the copying function has been received (YES at step S25), and decides whether the second individual screen is displayed on the display unit 112 (step S30).

Since the first individual screen 80 is currently displayed on the display unit 112, the controller 106 decides that the second individual screen is not displayed (NO at step S30), and reads out the setup screen, and the second individual information associated with the user name that has been inputted, from the storage device 104 (step S31).

After reading out the second individual information, the controller 106 displays the setup screen 60 that has been read out, and the second individual screen 90 showing the second individual information that has been read out, on the first display panel of the display unit 112. More specifically, the controller 106 displays the setup screen 60 on the display region 112A of the display unit 112, and the second individual screen 90 on the display region 112B of the display unit 112.

After displaying the second individual screen 90, the controller 106 decides whether the display device 101 is in the closed state, according to the signal outputted from the state detector 103 (step S29). Since the display device 101 is still open at this point, the controller 106 decides that the display device 101 is not in the closed state, according to the signal outputted from the state detector 103 (NO at step S29), and proceeds to step S25.

Until the selection instruction is cancelled, or until the display device 101 is closed, the controller 106 repeats the operation of deciding that the selection instruction has been received (YES at step S25), deciding that the second individual screen is displayed (YES at step S30), and deciding that the display device 101 is not in the closed state (NO at step S29), without performing the operation of step S31 and step S32.

The user touches the key 64 on the setup screen 60, after touching the short-cut key 91A on the second individual screen 90. Upon detecting through the touch panel 102 that the key 64 has been touched, the controller 106 accepts the setting detail associated with the short-cut key 91A, as the confirmed setting detail. The controller 106 transmits the setting detail to the image forming apparatus 1, through the communication device 105. Upon receipt of the setting detail transmitted from the terminal device 3, the image forming apparatus 1 accepts the setting detail that has been received, as the confirmed setting detail.

After touching the key 64, the user places a source document on the platen glass of the image reading device 11, and presses the start key 16B to start the copying operation. Upon detecting that the start key 16B has been pressed, the controller 106 causes the image reading device 11 to read the source document placed on the platen glass, and generate the image data, in accordance with the setting detail confirmed as above. After the image data is generated, the controller 106 causes the image forming device 12 to form the image based on the image data on a recording sheet, in accordance with the confirmed setting detail.

With the configuration according to the second embodiment, the controller 106 transmits the setting detail inputted through the touch panel 102, to the image forming apparatus 1 through the communication device 105. Accordingly, the user can input the instruction directed to the image forming apparatus 1 through the terminal device 3 being carried by the user, which leads to improved user-friendliness of the device.

Other Variations

In the first embodiment, the controller 10 performs the authentication using the password stored in the HDD 17 and the password inputted through the touch panel 16A. However, the disclosure is not limited to such an arrangement. For example, the controller 10 may perform fingerprint authentication, using fingerprint information stored in the HDD 17 as the user information, and the information acquired from the image of the user, for example shot by a camera installed in the casing 31.

Alternatively, the controller 10 may perform face authentication, using face information indicating the feature of the user's face, stored in the HDD 17 as the user information, and the information acquired from the image of the user, for example shot by a camera installed in the casing 31.

Although the magnet 34B and the Hall IC 34A are employed to constitute the state detector 34 in the first embodiment, the disclosure is not limited to such a configuration. For example, a mechanical switch system may be employed as the state detector 34.

In addition, although two passwords are stored in advance in the HDD 17 in the first variation, the disclosure is not limited to such an arrangement. For example, three passwords may be stored in the HDD 17. In this case, the first individual information and the second individual information are classified into high-level information, mid-level information, and low-level information, and stored in this form in the HDD 17.

When the password inputted through the touch panel 16A agrees with the first password, the controller 10 displays the individual screen showing only the low-level information, on the second display unit 32A. When the inputted password agrees with the second password, the controller 10 displays the individual screen showing only the low-level information and the mid-level information, on the second display unit 32A. When the inputted password agrees with the third password, the controller 10 displays the individual screen showing all of the high-level information, the mid-level information, and the low-level information, on the second display unit 32A.

In the first variation, further, out of the first individual information, the information indicating the address book data, the memo pad data, and the electronic file names is stored as the high-level information, and the information indicating the predetermined functions is stored as the low-level information, in the HDD 17. However, the disclosure is not limited to such an arrangement. For example, the information indicating the address book data and the electronic file names may be stored as the high-level information, and the information indicating the memo pad data and the predetermined functions may be stored as the low-level information, in the HDD 17.

Likewise, out of the second individual information, the memo pad data is stored as the high-level information, and the information indicating the predetermined setting detail is stored as the low-level information in the HDD 17, according to the first variation. However, the disclosure is not limited to such an arrangement. For example, the information indicating the predetermined setting detail may be stored as the high-level information, and the memo pad data may be stored as the low-level information, in the HDD 17.

Although the terminal device 3 is configured to make communication with the image forming apparatus 1 provided with the display device 15 of the foldable type in the second embodiment, the disclosure is not limited to such a configuration. For example, the terminal device 3 may make communication with an image forming apparatus having a display device that is not of the foldable type, in other words an image forming apparatus not configured to perform the individual information displaying operation, according to the disclosure.

Further, although the image forming device 12 is configured to form an image on the recording sheet, in the first and second embodiments, the disclosure is not limited to such a configuration. The image forming device 12 may form an image on a different recording medium, other than the recording sheet. For example, an overhead projector (OHP) sheet may be employed, to form an image.

The disclosure may be modified in various manners, without limitation to the first and second embodiments. For example, although the electronic device according to the second embodiment of the disclosure is exemplified by the tablet style terminal device, a smartphone may be employed instead.

Further, the configurations and processings described in the first and second embodiments with reference to FIG. 1 and FIG. 11 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a display device configured to be folded;
   a state detector that detects whether the display device is in a folded state or an open state;
   a storage device containing, in advance, user information for identifying a user, and first information associated with the user information;
   an input device to be used by the user to input information; and
   a control device including a processor, and configured to act, when the processor executes a control program, as a controller that:
   causes the display device to display, when the open state is detected by the state detector and when the user information stored in the storage device and the information received through the input device agree with each other, the first information stored in the storage device in association with the user information on a first display panel exposed in the open state; and
   restricts the display device from displaying the first information, when the open state is detected by the state detector, but the user information and the information received through the input device disagree, or when the folded state is detected by the state detector.

2. The electronic device according to claim 1,
   wherein the storage device further contains second information not associated with the user information, and
   the controller causes the display device, when the folded state is detected by the state detector, to display the second information stored in the storage device on the second display panel exposed in the folded state.

3. The electronic device according to claim 2,
   wherein the storage device contains, as the second information, a selection screen for selecting one of one or more functions that can be performed, and a setup screen for setting a detail with respect to the one of the one or more functions, and
   the controller causes the display device to display:
   the selection screen together with the first information, when the open state is detected by the state detector, when the user information and the information received through the input device agree with each other and when a selection instruction for selecting one of the one or more functions has not been received; and the setup screen, when the open state is detected by the state detector, when the user information and the information received through the input device agree with each other and when a selection instruction for selecting one of the one or more functions has been received, with respect to the selected function together with the first information.

4. The electronic device according to claim 1, wherein the storage device contains, as the first information, information indicating a predetermined function out of one or more functions that can be performed, and the controller causes the display device, when the open state is detected by the state detector, when the user information and the information received through the input device agree with each other and when an instruction to select one of the one or more functions has not been received, to display the information indicating the predetermined function stored in the storage device, on the first display panel.

5. The electronic device according to claim 1, wherein the storage device contains, as the first information, information indicating a predetermined setting detail, with respect to a predetermined function out of one or more functions that can be performed, and the controller causes the display device, when the open state is detected by the state detector, when the user information and the information received through the input device agree with each other and when an instruction to select one of the one or more functions has been received, to display the information indicating the setting detail stored in the storage device, on the first display panel.

6. The electronic device according to claim 5, further comprising a communication device that makes communication, via a network, with an image forming apparatus including an image forming device that forms an image on a recording medium, wherein the controller transmits, upon receipt of an instruction to confirm the setting detail displayed on the first display panel, through the input device, the setting detail to the image forming apparatus through the communication device.

7. The electronic device according to claim 1, wherein the storage device contains a first password and a second password as the user information, and the first information classified into information of a high security level and information of a low security level, and the controller causes the display device to display:

only the information of the low security level out of the first information on the first display panel, when the open state is detected by the state detector and when the first password stored in the storage device and the information received through the input device agree with each other, and both of the information of the high security level and the information of the low security level out of the first information on the first display panel, when the open state is detected by the state detector and when the second password stored in the storage device and the information received through the input device agree with each other.

8. An image forming apparatus comprising:

the electronic device according to claim 1; and an image forming device that forms an image on a recording medium.

* * * * *